United States Patent
Vogt et al.

(10) Patent No.: US 9,022,453 B2
(45) Date of Patent: May 5, 2015

(54) COVERING DEVICE

(71) Applicant: Dr. Ing. h.c. F. Porsche Aktiengesellschaft, Stuttgart (DE)

(72) Inventors: Stephan Vogt, Althengstett (DE); Bodo Chalupnik, Krefeld (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/098,833

(22) Filed: Dec. 6, 2013

(65) Prior Publication Data

US 2014/0158311 A1   Jun. 12, 2014

(30) Foreign Application Priority Data

Dec. 7, 2012   (DE) .......................... 10 2012 111 981

(51) Int. Cl.
*B60J 1/18*        (2006.01)
*B60R 5/04*        (2006.01)

(52) U.S. Cl.
CPC ... *B60J 1/18* (2013.01); *B60R 5/047* (2013.01)

(58) Field of Classification Search
CPC ........ B60R 5/047; B60R 21/06; B60R 21/08; B60R 5/048

USPC ............. 296/100.01, 37.16, 37.8, 24.3, 24.4, 296/24.43, 98; 160/239, 238, 24, 370.22, 160/315, 290; 280/748, 749
See application file for complete search history.

(56) References Cited

U.S. PATENT DOCUMENTS

| | | | |
|---|---|---|---|
| 6,039,105 A * | 3/2000 | Patmore et al. .................. 160/24 |
| 6,517,136 B2 * | 2/2003 | De Ceuster ................ 296/37.16 |
| 7,014,239 B2 * | 3/2006 | Ehrenberger ................ 296/37.1 |
| 8,011,712 B2 | 9/2011 | Hofmann | |
| 2005/0023854 A1 * | 2/2005 | Woerner et al. ............ 296/24.43 |
| 2009/0051189 A1 * | 2/2009 | Hofmann .................. 296/107.08 |

FOREIGN PATENT DOCUMENTS

DE   10 2006 061 505   6/2008
DE   10 2007 039 859   2/2009

* cited by examiner

*Primary Examiner* — Glenn Dayoan
*Assistant Examiner* — Sunsurraye Westbrook
(74) *Attorney, Agent, or Firm* — Gerald E. Hespos; Michael J. Porco; Matthew T. Hespos

(57) ABSTRACT

A covering device for a luggage compartment of a vehicle substantially comprises a trunk covering comprising an inner roller blind which covers the luggage compartment. In order to install the trunk covering in, and remove the latter from, the vehicle, said trunk covering is brought by one end vertically and horizontally into a plug-in device on the vehicle, wherein the remote, other longitudinal end of the trunk covering is latched in a lock by means of a rotational movement.

13 Claims, 3 Drawing Sheets

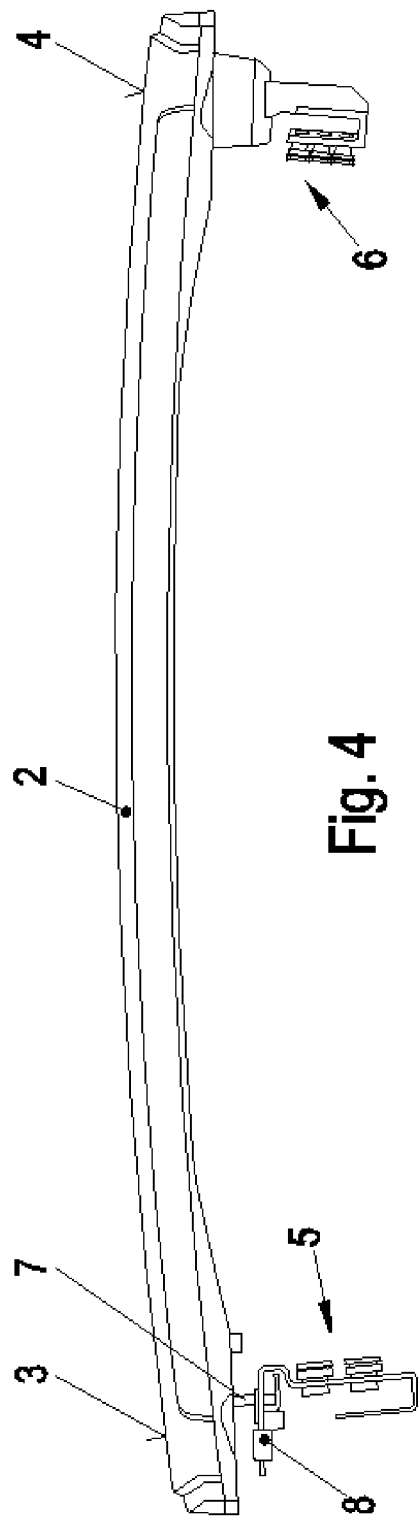
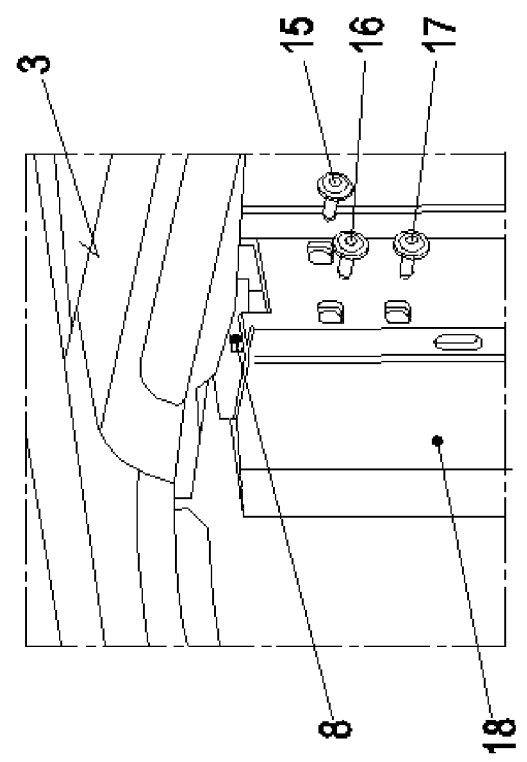

COVERING DEVICE

CROSS REFERENCE TO RELATED APPLICATION

This application claims priority under 35 USC 119 to German Patent Appl. No. 10 2012 111 981.3 filed on Dec. 7, 2012, the entire disclosure of which is incorporated herein by reference.

BACKGROUND

1. Field of the Invention

The invention relates to a covering device comprising a trunk covering arranged behind a seat in a motor vehicle.

2. Description of the Related Art

DE 10 2006 061 505 A1 discloses a roller blind unit for a covering of a vehicle storage compartment. The roller blind unit is adjustable at one longitudinal end about a vertical pivot axis and the opposite longitudinal end is rotatable about the pivot axis horizontally in a fastening position on the vehicle body. DE 10 2007 039 859 A1 discloses a covering arrangement comprising a trunk covering arranged behind a vehicle seat in a motor vehicle. The trunk covering extends in the transverse direction of the vehicle and is held by the longitudinal ends thereof in receptacles on the vehicle. One longitudinal end of the trunk covering is pluggable horizontally into a receptacle. The opposite longitudinal end is pivotable counter to the direction of travel of the vehicle into the receptacle and is latchable therein.

The object of the invention is to obtain simple manual handling of the trunk covering for installation in and removal from a vehicle.

SUMMARY OF THE INVENTION

The invention relates to a user friendly trunk covering that can be installed in and removed from the vehicle can be carried out by simple, comprehensible movement procedures in the vertical direction and in the transverse direction and by a rotational movement of the trunk covering. The trunk covering is installed in the vehicle by introducing a first free longitudinal end of the trunk covering into a plug-in device on the vehicle vertically from above downward—with respect to the vehicle—in the z direction and from the inside outward in the y direction. The first end is held via a bar on the lower side of the trunk covering in a guide element of the plug-in device. The second free longitudinal end of the trunk covering is pivotable from above with a rotational movement into the lock receptacle on the vehicle and is held in a latched manner therein.

The trunk covering is removed by pivoting the remote longitudinal end up with a rotational movement out of the lock receptacle and then moving the trunk covering in the z direction and in the y direction in a reverse sequence from installing the trunk covering. The movement procedures for installing and removing the trunk covering are configured to be carried out in the interior of the vehicle without the user twisting, since removal involves only displacement movements in the vertical and transverse directions and a relatively small rotational movement.

The rotational movement of the trunk covering takes place about the bar of the trunk covering. The bar is held in the guide element of the plug-in device and defines a fixed point. The pivoting angle for installing and removing the trunk covering with respect to a horizontal plane is approximately two degrees and should therefore be considered small. The angle of the rotational movement of the trunk covering for installation and removal is therefore very small and hence no great movements of the user are required. Similarly, the displacement movements of the trunk covering in the transverse direction are small, and therefore no extraordinary efforts are required by the user for the installation and removal, and hence a user-friendly trunk covering is provided.

The plug-in device on the vehicle comprises a horizontally oriented receiving plate in a profile element. The receiving plate is held on the body and has a longitudinal slot in which the guide element is arranged. The guide element receives the bar of the trunk covering in a slot in the installation position. The bar preferably is T-shaped, and, in the installation position, is held in the guide element. The bar is displaceable outward into an end position for installing the trunk covering and is displaceable inward into a release position for removal. The guide element has a corresponding guide for the insertion of the T-shaped bar. The T-shaped bar in the guide element of the plug-in device holds the trunk covering by one longitudinal end fixedly in the vehicle. The other longitudinal end is held in a latching manner via a lock on the vehicle to achieve double locking.

An exemplary embodiment of the invention is illustrated in the drawings and is described in more detail below.

BRIEF DESCRIPTION OF THE DRAWINGS

FIG. 4 is a view of a fitted trunk covering with the T-shaped bar held in the plug-in device and with the lock latched.

FIG. 5 shows an installation position via screw and nut elements in the x, y and z direction of the plug-in device and of the lock in profiles of the vehicle body.

DETAILED DESCRIPTION OF THE PREFERRED EMBODIMENTS

Figure 1:
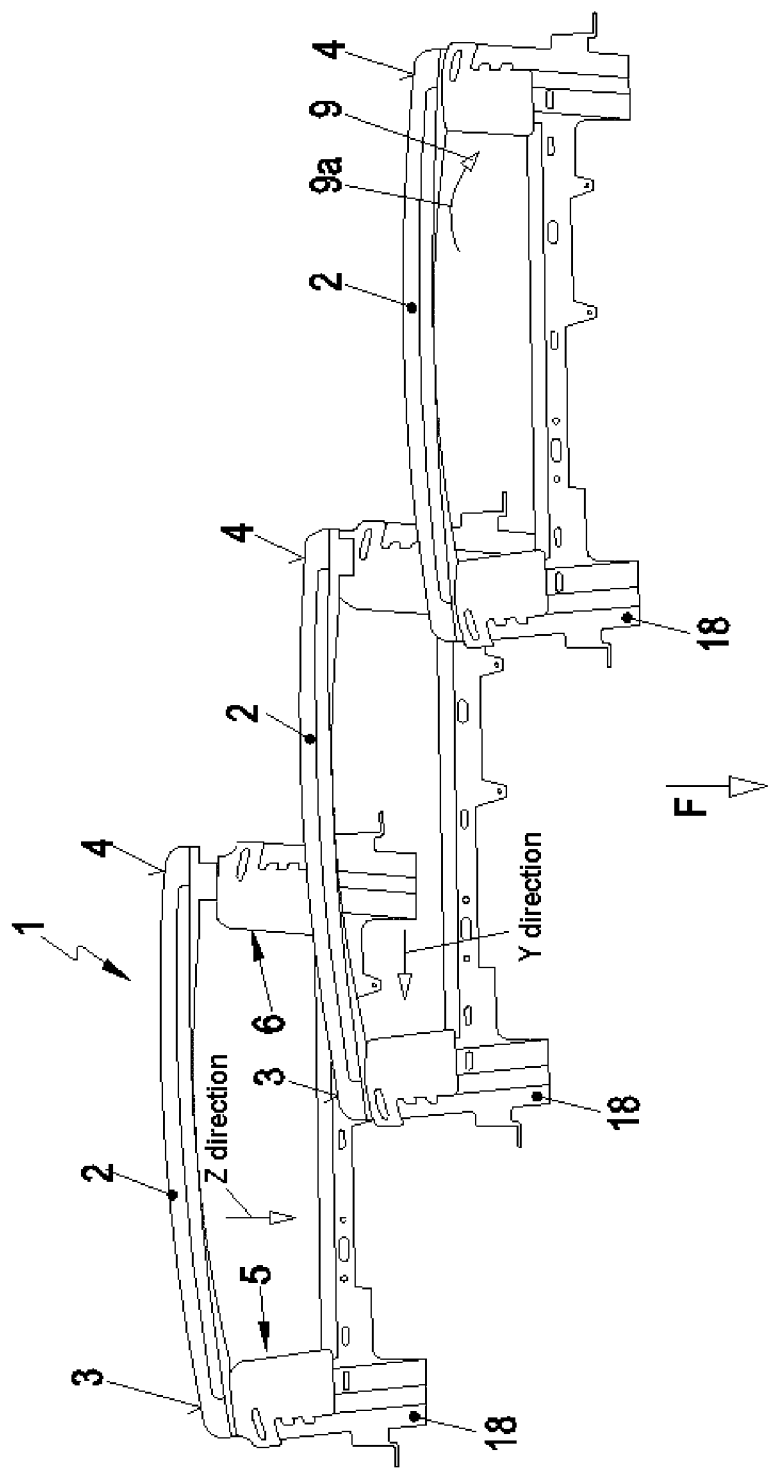
FIG. 1 shows an illustration of an installation and removal procedure of a trunk covering in a vehicle.
Figure 2:
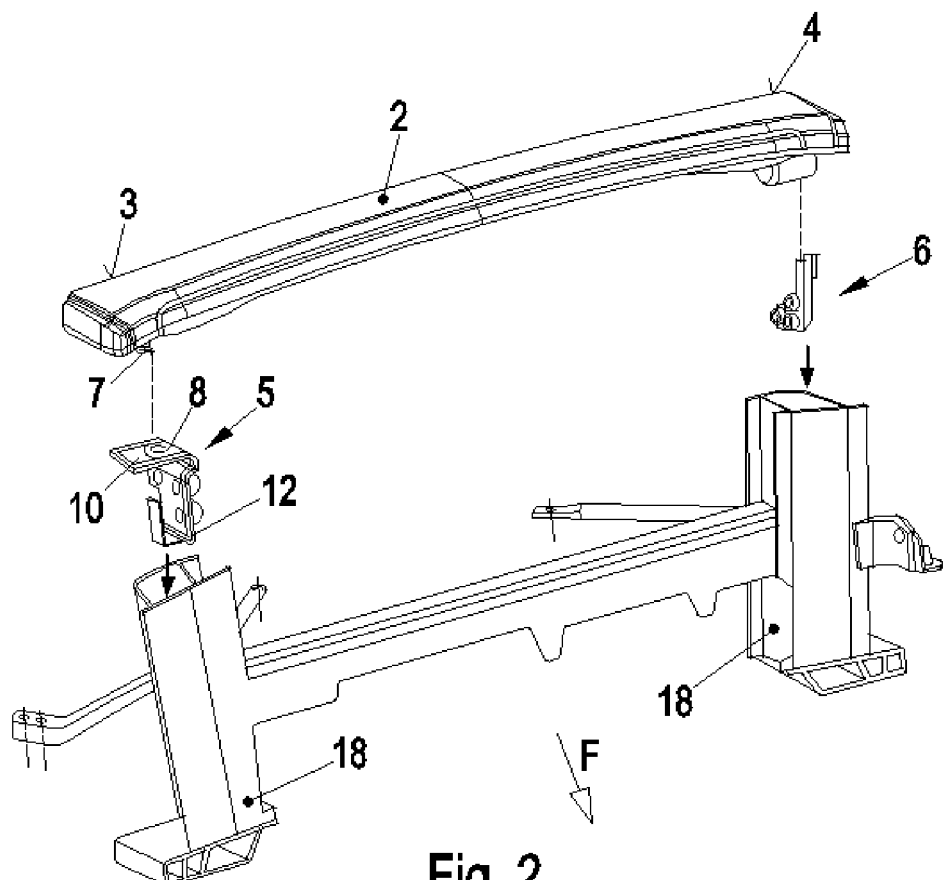
FIG. 2 is a view of the removed trunk covering with the plug-in device and lock element.

A covering device 1 in a vehicle substantially comprises a trunk covering 2 in the form of a roller blind that covers a luggage compartment and is arranged in a housing or a cassette. The trunk covering 2 extends transversely in the vehicle and, in an installation position I, is held by longitudinal ends 3, 4 in a plug-in device 5 on the vehicle and in a lock 6 on the vehicle.

To install the trunk covering 2 in the vehicle, the first free longitudinal end 3 is inserted down into the plug-in device 5 on the vehicle vertically from above—as seen with respect to the z direction of the vehicle—and transversely from the inside out in the y direction. A bar 7 is arranged on the lower side of the trunk covering 2 engages in a guide element 8 of the plug-in device 5 and is held therein. The bar 7 is introduced into the guide element 8 via a longitudinal guide slot 19. The second free longitudinal end 4 of the trunk covering 2 is pivotable from above with a rotational movement in the arrow direction 9 into the lock receptacle 6 on the vehicle and is held in a latching manner therein.

The trunk covering 2 is removed upward by pivoting the second longitudinal end 4 up out of the lock receptacle 6 with a rotational movement in the direction of the arrow 9a. The subsequent adjustment movements of the trunk covering 2 in the z direction (transversely) and in the y direction (vertically) take place in a reverse sequence to the installation of the trunk covering 2 in the vehicle.

The rotational movement of the trunk covering 2 takes place about the bar 7, which is held in the guide element 8 of the plug-in device 5 and is in the form of a fixed point. The pivoting angle of the trunk covering 2 for installation and removal with respect to a horizontal plane is approximately two degrees.

Figure 3:
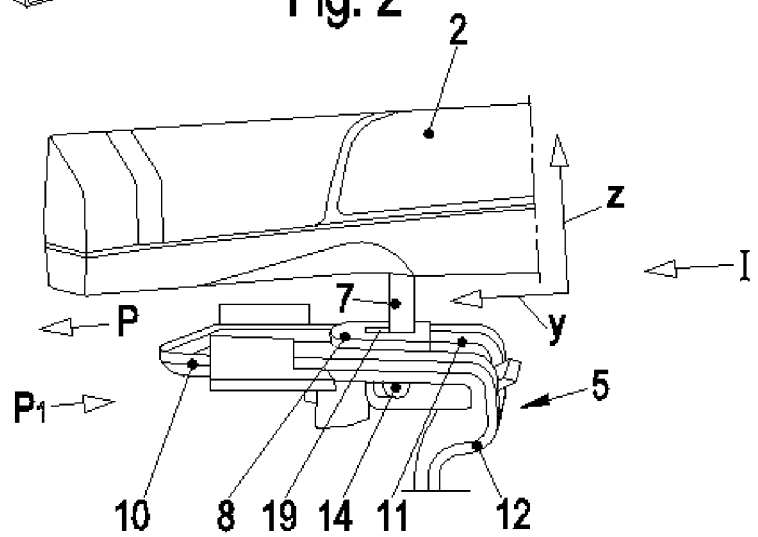
FIG. 3 is an enlarged illustration of the plug-in device with the guide element and received T-shaped bar.

The plug-in device 5 on the vehicle comprises a receiving plate 10 that is integrated on the body into a profile element 12 and has a longitudinal slot 11 in which the guide element 8 is arranged. The guide element 8 that receives the bar 7 of the trunk covering 2 in the installation position is illustrated in more detail in FIG. 3. The bar 7 is inserted into the guide element 8 via an insertion opening in the longitudinal guide 19.

The bar 7 preferably is T-shaped and, in the installation position I, is held in the guide element 8. More particularly, a transverse web 14 that is arranged on the lower part of the bar 7 engages under the guide element 8 and, for installing the trunk covering 2, is displaceable outward in the arrow direction P into an end position and, for removal, is displaceable inward in the arrow direction P1 into a release position.

The profile element 12 of the plug-in device 5 and the lock element 6 are held in the y direction in profiles 18 on the vehicle body via three screws 15, 16 and 17 in screw nuts and are adjustable therein in the x, y and z direction, thus minimizing the formation of a gap between a lining and the trunk covering 2.

What is claimed is:

1. A covering device to be arranged behind a seat in a motor vehicle, the covering device comprising:
   a plug-in device formed rearward of the seat, the plug-in device having a guide element with a slot elongated in a transverse direction of the vehicle;
   a lock receptacle at a position on the vehicle transversely opposite the plug-in device; and
   a trunk covering having opposite first and second longitudinal ends a bar projecting vertically down in a z-direction from the first end and a transverse web at a lower end of the bar, wherein
   the first longitudinal end of the trunk covering is introduced vertically downward in the z-direction into the plug-in device so that the bar enters the slot and from the inside outward in a y-direction so that the bar moves transversely through the slot, and
   the second longitudinal end of the trunk covering is pivoted from above with a rotational movement into the lock receptacle on the vehicle and is latched therein.

2. The device of claim 1, wherein the trunk covering is removed by pivoting the remote longitudinal end upward out of the lock receptacle by a rotational movement and the subsequent adjustment movements of the trunk covering in the z direction and in the y direction take place in a reverse sequence to the procedure of installing the trunk covering.

3. The device of claim 1, wherein the rotational movement of the trunk covering takes place about the bar of the trunk covering, the bar being held in the guide element of the plug-in device and defines a fixed point, the pivoting angle for installing and removing the trunk covering with respect to a horizontal plane is approximately two degrees.

4. The device of claim 3, wherein the displacement movement of the trunk covering in the y direction from the inside outward and from the outside inward for installation and removal is approximately 10 mm.

5. The device of claim 1, wherein the plug-in device on the vehicle comprises a horizontally oriented receiving plate of a profile element with the guide element formed therein.

6. The device of claim 5, wherein the profile element of the plug-in device and the lock element are fastenable adjustably in a profile of the vehicle body via screws that are incorporated into inner screw nuts.

7. The device of claim 1, wherein the bar is T-shaped and is displaceable in the guide element away from a longitudinal center of the vehicle for installing the trunk covering and is displaceable toward the longitudinal center of the vehicle into a release position for removal.

8. A covering device for covering a storage area behind a seat of a motor vehicle, comprising:
   a trunk covering having opposite first and second longitudinal ends spaced apart in a transverse direction of the vehicle, a bar projecting down at the first end of the trunk covering and a transverse web at a lower end of the bar;
   a plug-in device on the vehicle having a guide element with a slot elongated in the transverse direction of the vehicle configured to receive the transverse web and portions of the bar adjacent the transverse web; and
   a lock receptacle at a position on the vehicle transversely opposite the plug-in device and configured to releasably lock the second end of the trunk covering, wherein
   the bar is configured to be inserted into the slot from above and transversely away from the lock receptacle, and
   the second longitudinal end of the trunk covering is pivoted downward into engagement with the lock receptacle.

9. The covering device of claim 8, wherein the slot is configured to permit pivoting of the first end of the trunk covering about an axis aligned parallel to a longitudinal axis of the vehicle and to permit translation of the first end of the trunk covering in a direction transverse to the longitudinal direction.

10. The device of claim 9, wherein the bar is displaceable in the guide element away from a longitudinal center of the vehicle for installing the trunk covering and is displaceable toward the longitudinal center of the vehicle into a release position for removal.

11. The device of claim 9, wherein a pivoting angle for installing and removing the trunk covering with respect to a horizontal plane is approximately two degrees.

12. The device of claim 11, wherein the displacement movement of the trunk covering in the transverse direction for installation and removal is approximately 10 mm.

13. The device of claim 9, wherein the plug-in device on the vehicle comprises a horizontally oriented receiving plate of a profile element, the slot being in the receiving plate.

* * * * *